US009230005B2

(12) United States Patent
Bak et al.

(10) Patent No.: US 9,230,005 B2
(45) Date of Patent: Jan. 5, 2016

(54) SPATIOTEMPORAL ENCOUNTERS DETECTION IN HISTORICAL MOVEMENT DATASETS

(71) Applicant: International Business Machines Corporation, Armonk, NY (US)

(72) Inventors: Peter Bak, Bat Chen (IL); Sivan Harary, Haifa (IL); Mattias Marder, Haifa (IL); Harold Jeffrey Ship, Mizpe Netofa (IL); Avi Yaeli, Ramot Menashe (IL)

(73) Assignee: International Business Machines Corporation, Armonk, NY (US)

( * ) Notice: Subject to any disclaimer, the term of this patent is extended or adjusted under 35 U.S.C. 154(b) by 375 days.

(21) Appl. No.: 13/731,017

(22) Filed: Dec. 30, 2012

(65) Prior Publication Data

US 2014/0188940 A1 Jul. 3, 2014

(51) Int. Cl.
*G06F 17/30* (2006.01)
*G06K 9/00* (2006.01)

(52) U.S. Cl.
CPC ...... *G06F 17/30587* (2013.01); *G06K 9/00771* (2013.01); *G06K 2209/27* (2013.01)

(58) Field of Classification Search
None
See application file for complete search history.

(56) References Cited

U.S. PATENT DOCUMENTS

| 7,379,978 | B2 * | 5/2008 | Anderson et al. ............. 709/219 |
| 8,078,394 | B2 | 12/2011 | Wang et al. |
| 2003/0135636 | A1 * | 7/2003 | Walsh et al. .................. 709/232 |
| 2006/0058944 | A1 * | 3/2006 | Imasaki et al. ................ 701/200 |
| 2006/0101377 | A1 * | 5/2006 | Toyama et al. ................ 717/104 |
| 2007/0185739 | A1 * | 8/2007 | Ober et al. ......................... 705/3 |
| 2008/0243908 | A1 | 10/2008 | Aasman et al. |
| 2009/0164412 | A1 * | 6/2009 | Bestgen et al. ................... 707/2 |
| 2009/0177998 | A1 * | 7/2009 | Barrios et al. ................ 715/799 |
| 2010/0082654 | A1 | 4/2010 | Zhang et al. |
| 2011/0173193 | A1 * | 7/2011 | Ahn et al. ...................... 707/725 |
| 2012/0150955 | A1 * | 6/2012 | Tseng ........................... 709/204 |
| 2012/0251011 | A1 * | 10/2012 | Gao et al. ....................... 382/224 |
| 2012/0253935 | A1 * | 10/2012 | Blom ......................... 705/14.58 |
| 2013/0073995 | A1 * | 3/2013 | Piantino et al. ............... 715/764 |
| 2013/0132808 | A1 * | 5/2013 | Whiting ........................ 715/202 |
| 2013/0249905 | A1 * | 9/2013 | Matthews et al. ............ 345/420 |
| 2013/0316735 | A1 * | 11/2013 | Li et al. ...................... 455/456.3 |

FOREIGN PATENT DOCUMENTS

WO 2012042814 4/2012

OTHER PUBLICATIONS

"Spatial Database," Wikipedia, The Free Encyclopedia. Dec. 29, 2011, http://en.wikipedia.org/w/index.php?title=Spatial_database&oldid=468284883, (accessed Feb. 26, 2015).*

(Continued)

*Primary Examiner* — Richard Bowen

(57) ABSTRACT

Methods, system and computer program products for spatiotemporal encounters detection of a plurality of moving objects are disclosed. The method includes receiving a dataset of a plurality of objects moving in a domain, structuring the dataset in a data structure to detect a plurality of spatiotemporal encounters among the plurality of objects, outputting a list of the detected spatiotemporal encounters. The plurality of spatiotemporal encounters may be detected in a single sweep over the received dataset.

19 Claims, 18 Drawing Sheets

(56) References Cited

OTHER PUBLICATIONS

Guibas et al., "Kinetic collision detection: Algorithms and experiments", Proceedings 2001 ICRA. IEEE International Conference on Robotics and Automation, vol. 3, pp. 2903-2910, 2001.

Zhang Ping and Du guang-long, "A fast continuous collision detection algorithm based on K-DOPs", 2011 International Conference on Electronics, Communications and Control (ICECC), pp. 617-621, 2011.

* cited by examiner

SPATIOTEMPORAL ENCOUNTERS DETECTION IN HISTORICAL MOVEMENT DATASETS

BACKGROUND

The present invention, in some embodiments thereof, relates to a spatiotemporal encounters detection and, more specifically, but not exclusively, to a spatiotemporal encounters detection in historical movement dataset.

With the widespread adoption of location aware technologies, such as global positioning system (GPS) and radio frequency identification (RFID), huge amounts of data about moving objects are captured and stored in digital repositories. The moving objects may be people, animals, shipping containers, ships, buses and airplanes. The movement of objects may be captured by recording their locations at regular or irregular time steps.

An important class of movement patterns deals with the movement of objects in relation to one another. For example, this may involve finding two nearby ships that are moving in the same direction and speed for some period of time and finding two cars that pass through the same road junction within a given time window. These two examples belong to encounter patterns of objects being close to one another in space and time. Encounters may be further classified into specific types based on additional attributes of the moving objects, such as direction and speed.

SUMMARY

Methods, systems and computer program products for spatiotemporal encounters detection of a plurality of moving objects are disclosed. The method includes receiving a dataset of a plurality of objects moving in a domain, structuring the dataset in a data structure to detect a plurality of spatiotemporal encounters among the plurality of objects, outputting a list of the detected spatiotemporal encounters. The plurality of spatiotemporal encounters may be detected in a single sweep over the received dataset.

According to a further feature of an embodiment of the present invention, a spatiotemporal encounters detection system is disclosed. The spatiotemporal encounters detection system includes a storage medium for storing a dataset and spatiotemporal encounters detection program code, a central processing unit (CPU) coupled to said storage medium for executing the program code, receiving user defined parameters and visualizing the detected spatiotemporal encounters on a display.

According to a further feature of an embodiment of the present invention, a computer program product for spatiotemporal encounters detection in a dataset of moving objects is disclosed. The computer program product includes a computer readable storage medium, first program instructions to receive a dataset of a plurality of objects moving in a domain, second program instructions to concurrently order the dataset in a data structure and detect and store a plurality of spatiotemporal encounters among a plurality of objects in an output encounters list. The program instructions may be stored on the computer readable storage medium.

Unless otherwise defined, all technical and/or scientific terms used herein have the same meaning as commonly understood by one of ordinary skill in the art to which the invention pertains. Although methods and materials similar or equivalent to those described herein can be used in the practice or testing of embodiments of the invention, exemplary methods and/or materials are described below. In case of conflict, the patent specification, including definitions, will control. In addition, the materials, methods, and examples are illustrative only and are not intended to be necessarily limiting.

BRIEF DESCRIPTION OF THE SEVERAL VIEWS OF THE DRAWINGS

Some embodiments of the invention are herein described, by way of example only, with reference to the accompanying drawings. With specific reference now to the drawings in detail, it is stressed that the particulars shown are by way of example and for purposes of illustrative discussion of embodiments of the invention. In this regard, the description taken with the drawings makes apparent to those skilled in the art how embodiments of the invention may be practiced.

In the drawings.

DETAILED DESCRIPTION

Figure 1:
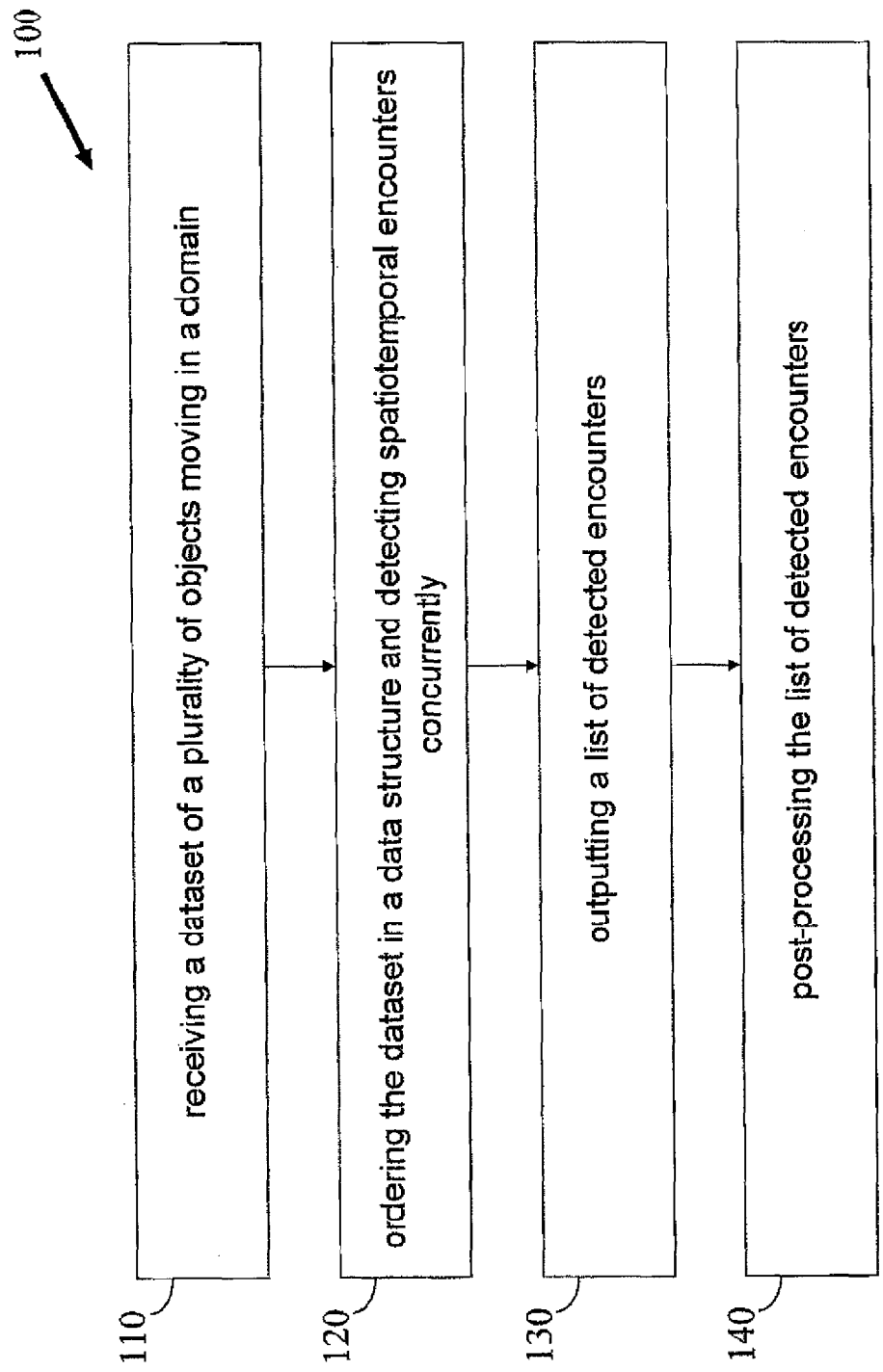
FIG. 1 is a flowchart that illustrates a method for spatiotemporal encounters detection of a plurality of moving objects, according to embodiments of the present invention.

According to some embodiments of the present invention, methods, systems and computer products are provided for detecting spatiotemporal encounters among a plurality of moving objects. The methods, systems and computer products use a designated data structure and a sliding window to discover encounters, optionally with a single sweep over the historical movement dataset.

The provided method for detecting spatiotemporal encounters enables users to interactively specify the spatial and temporal window sizes that define encounters and to analyze types of encounters that may be presented visually. The disclosed method's algorithm scale-up linearly and hence enables interactive visualization of the detected spatiotemporal encounters with large datasets. Optionally, interactive visualization of spatiotemporal encounters may be used for analyzing and recommending actions that may improve public transportation services.

As used herein, the term encounter means spatial proximity of at least two moving objects.

Before explaining at least one embodiment of the invention in detail, it is to be understood that the invention is not necessarily limited in its application to the details of construction and the arrangement of the components and/or methods set forth in the following description and/or illustrated in the drawings and/or the Examples. The invention is capable of other embodiments or of being practiced or carried out in various ways.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations of methods (e.g. FIGS. 1, 2 and 3), block diagrams (e.g. FIGS. 4 and 5), systems (e.g. FIG. 6) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Reference is now made to FIG. 1, which is a flowchart diagram of a method for spatiotemporal encounters detection of a plurality of moving objects, according to embodiments of the present invention. The spatiotemporal encounters detection method 100 is based on receiving a dataset of a plurality of objects moving in a domain 110. The dataset is ordered in a data structure to detect spatiotemporal encounters 120. This allows generating a list of the detected spatiotemporal encounters 130 for post processing 140. Advantageously, spatiotemporal encounters are detected by ordering the dataset in a data structure in a single sweep over the received dataset using a sliding window.

The spatiotemporal encounters detection method 100 may be applied to historical movement datasets and to real time streaming datasets.

The dataset domain may be an urban public transportation domain, trains transportation domain, local or international ships transportation domain, local or international airplanes transportation domain, animal tracking and people movement domains. More generally, the dataset domain may be transportation, traffic, retail and logistics and combinations of thereof.

The domain may be a two dimensional (2D) surface on which vehicles, such as cars and/or ships, sails and/or driven and/or a three dimensional (3D) space wherein airplanes fly. The vehicles may be autonomous or controlled by a human operator. Ground transportation may be represented in a 2D domain if tunnels and bridges are excluded or a 3D domain when tunnels and bridges are included. 3D maps may be converted to 2D maps or vice versa.

Optionally, the data structure includes spatial index structures that may be a set of sorted lists (SSL) of spatial containers; however, K-D trees and/or range trees may be used in other embodiments of the present invention. Each list may correspond with a time stamp and the lists may be ordered chronologically in the data structure.

Each list in the data structure may be ordered further according to the coordinates of the moving objects wherein structuring the dataset in a data structure and detecting spatiotemporal encounters concurrently 120 may be performed using pre-defined sliding temporal window size ($\Delta T$) and spatial window size ($\Delta S$) that determine an encounter. The temporal and spatial sliding window sizes may be modified interactively and the spatiotemporal encounter detection algorithm may be repeated with the modified window sizes.

Figure 2:
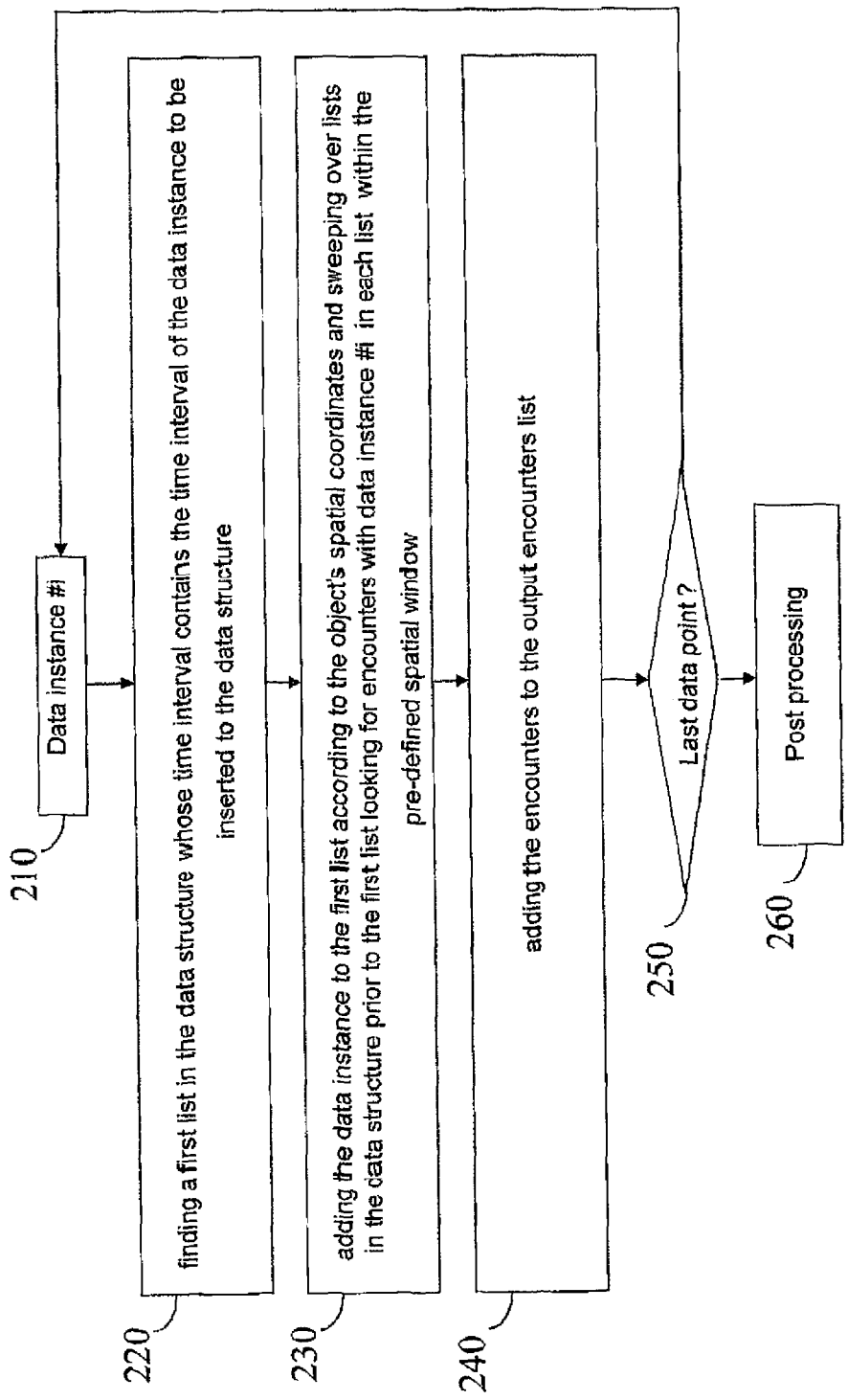
FIG. 2 is a flowchart that illustrates the spatiotemporal encounters detection method single sweep over historical movement dataset, according to embodiments of the present invention.

FIG. 2 is a flowchart that illustrates the spatiotemporal encounters detection method single sweep over the dataset, according to embodiments of the present invention. The spatiotemporal encounters detection method includes concurrent structuring the dataset in a data structure and detecting spatiotemporal encounters of a plurality of moving objects. For each data instance added to the data structure 210 the method includes: finding a first list in the data structure whose time stamp contains the time stamp of the data instance 220, adding the data instance to the first list according to the object's spatial coordinates and sweeping over lists in the data structure prior to the first list looking for encounters with the data instance in each list in a pre-defined spatial window 230, adding the encounters to the output encounters list 240. As shown in FIG. 2, the method includes a single sweep over all data instances of the dataset 210-250 and post processing the data stored in the encounters list after the last instance of the dataset is added to data structure 260.

Two data instances that belong to the same object in adjacent lists within the $\Delta S$ define a self-encounter. Lack of self encounters indicates a sparse historical movement dataset and an interpolation scheme illustrated in FIGS. 13-15 may be invoked to fill in the data structure with additional interpolated data instances.

Figure 3:
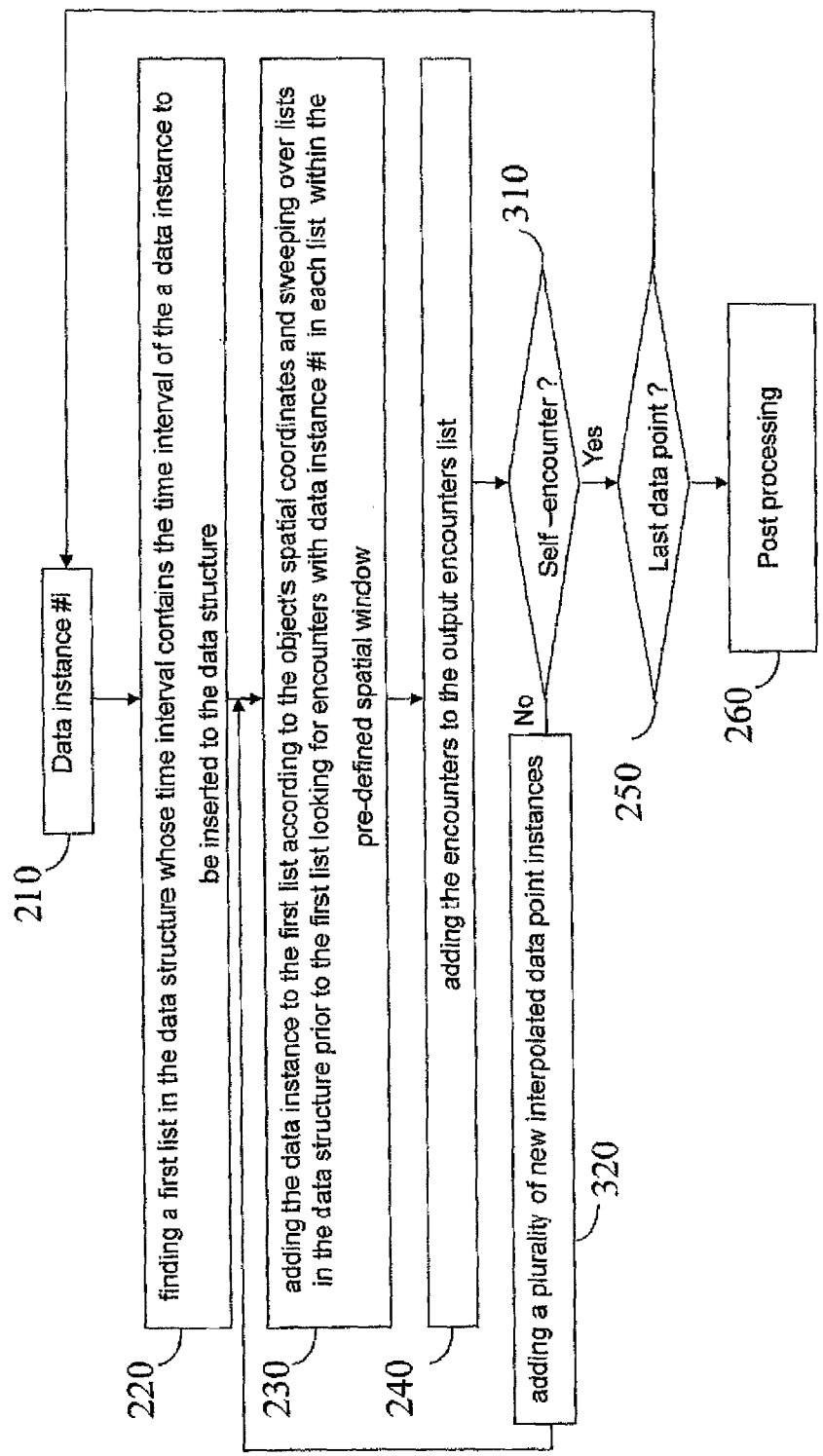
FIG. 3 is a flowchart that illustrates the spatiotemporal encounters detection method single sweep over historical movement dataset designed to cope with a sparse data structure, according to embodiments of the present invention.

FIG. 3 is a flowchart that illustrates the spatiotemporal encounters detection method single sweep over the historical movement dataset designed to cope with a sparse data structure, according to embodiments of the present invention. As used herein, the term sparse data structure means data structure having data instances of objects that lack self encounters in adjacent lists. The spatiotemporal encounters detection method described herein above and referring to FIG. 2 steps 210-260 includes further finding self encounters 310, adding a plurality of new interpolated data instances to the data structure lists 320 if no self encounters are detected in adjacent lists of the data structure in order to cope with a sparse data structure. The method includes repeating steps 230-240 for each data instance that lacks self encountering data instance in adjacent list. Self-encounters of two data instances of the same object are not added to the output encounters list 140. Detection of self-encounters and addition of interpolated data instances to the data structure are explained in details further below and illustrated in FIGS. 13-15.

The spatiotemporal encounters detection method is not limited to regular sampling rate. Advantageously, sparse and irregularly sampled datasets, captured by the global positioning system (GPS) for example, may be processed invoking the method's interpolation scheme used to add interpolated data instances to the sparse or irregular data structure.

Figure 4:
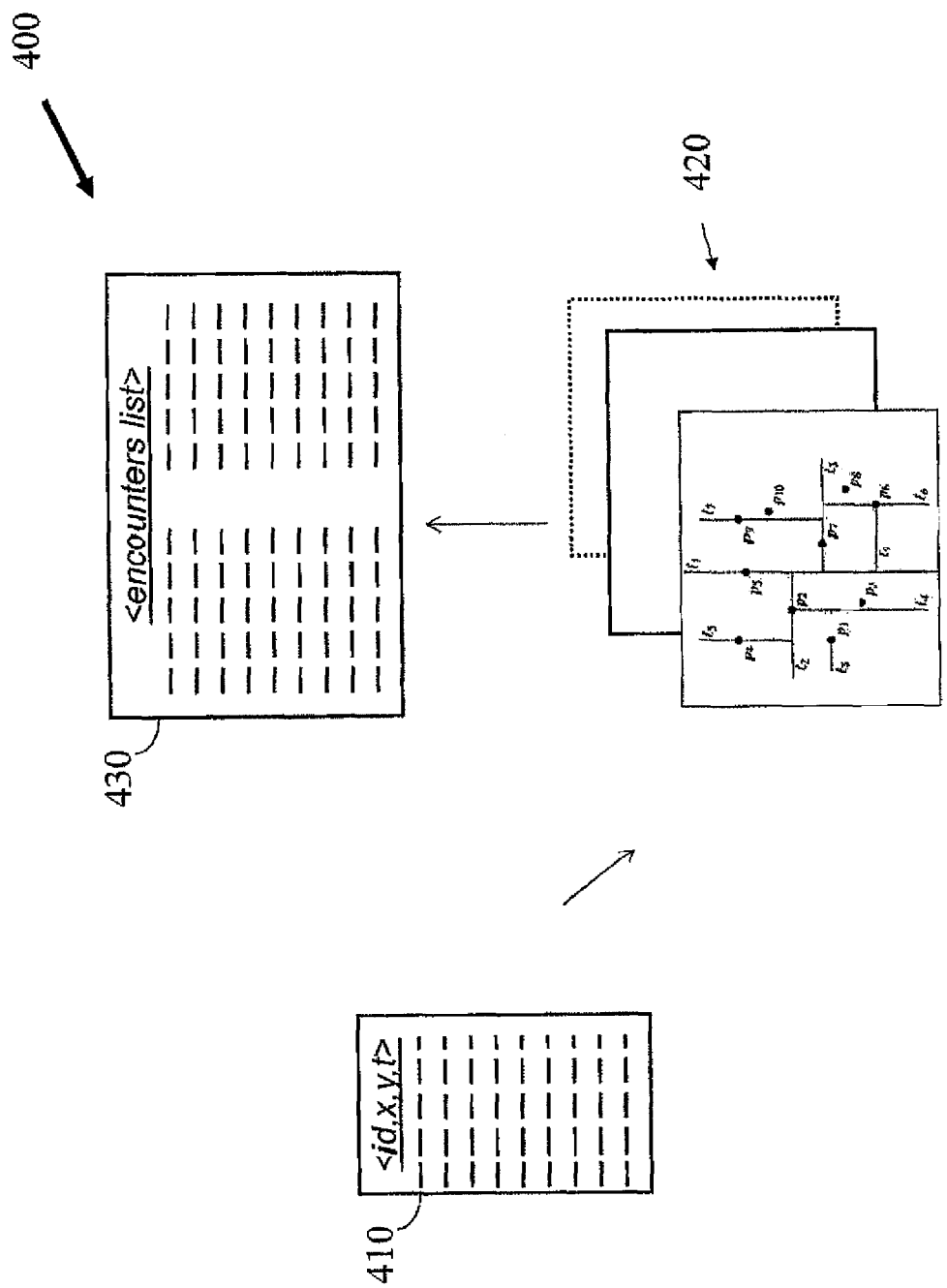
FIG. 4 is a schematic illustration of objects used in the spatiotemporal encounters detection method, according to embodiments of the present invention.

FIG. 4 is a schematic illustration of objects used in the spatiotemporal encounters detection method, according to embodiments of the present invention. The historical movement dataset 410 may be an urban public transportation dataset for example. The historical movement dataset 410 may be ordered in a data structure 420 to detect a plurality of spatiotemporal encounters 430 in a single sweep over the historical movement dataset 410 using $\Delta T$ and $\Delta S$ that may be further modified by users interactively.

Figure 5:
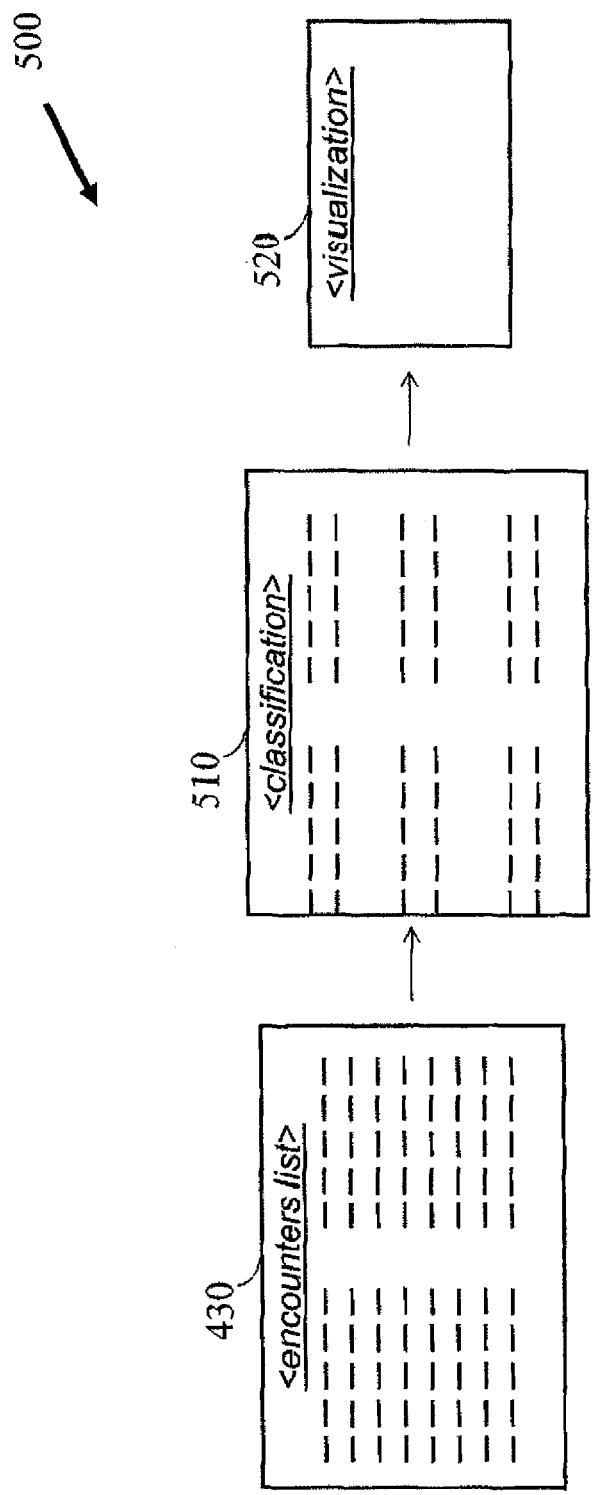
FIG. 5 is a schematic illustration of classifying and visualizing the detected spatiotemporal encounters, according to embodiments of the present invention.

Reference is now made to FIG. 5, which is a schematic illustration of optional classifying and visualizing the detected spatiotemporal encounters, according to embodiments of the present invention. The encounters list 430, stored in a storage medium memory, may be classified. Classification may be performed according to the moving objects velocities, directions, duration of encounters, trajectory patterns and/or any combination thereof.

Optionally, the classified spatiotemporal encounters data may be visualized 520. Visualization of detected encounter may be performed by connecting the data instances of two or more encountering objects by colored lines where the length of the line marks the distance between the encountering objects. Color may be mapped to different semantics of temporal attributes of the encounters. The classified spatiotemporal encounter patterns may be visualized on top of a background urban cartographic map for example.

Optionally, users may modify $\Delta T$ and $\Delta S$, interactively, rerun the single sweep algorithm described herein above referring to FIG. 2 for example and visualize the classified spatiotemporal encounters data with different spatiotemporal window sizes in order to discover encounter patterns in the domain. Encounter patterns may be classified to crossing a junction, head on driving and parallel driving for example. $\Delta T$ and $\Delta S$ are given as a non limiting example of parameters that may be modified interactively by users. Other parameters, such as the number of sorted lists in the temporal time window, may be modified by users and are in the scope of the present invention.

Figure 6:
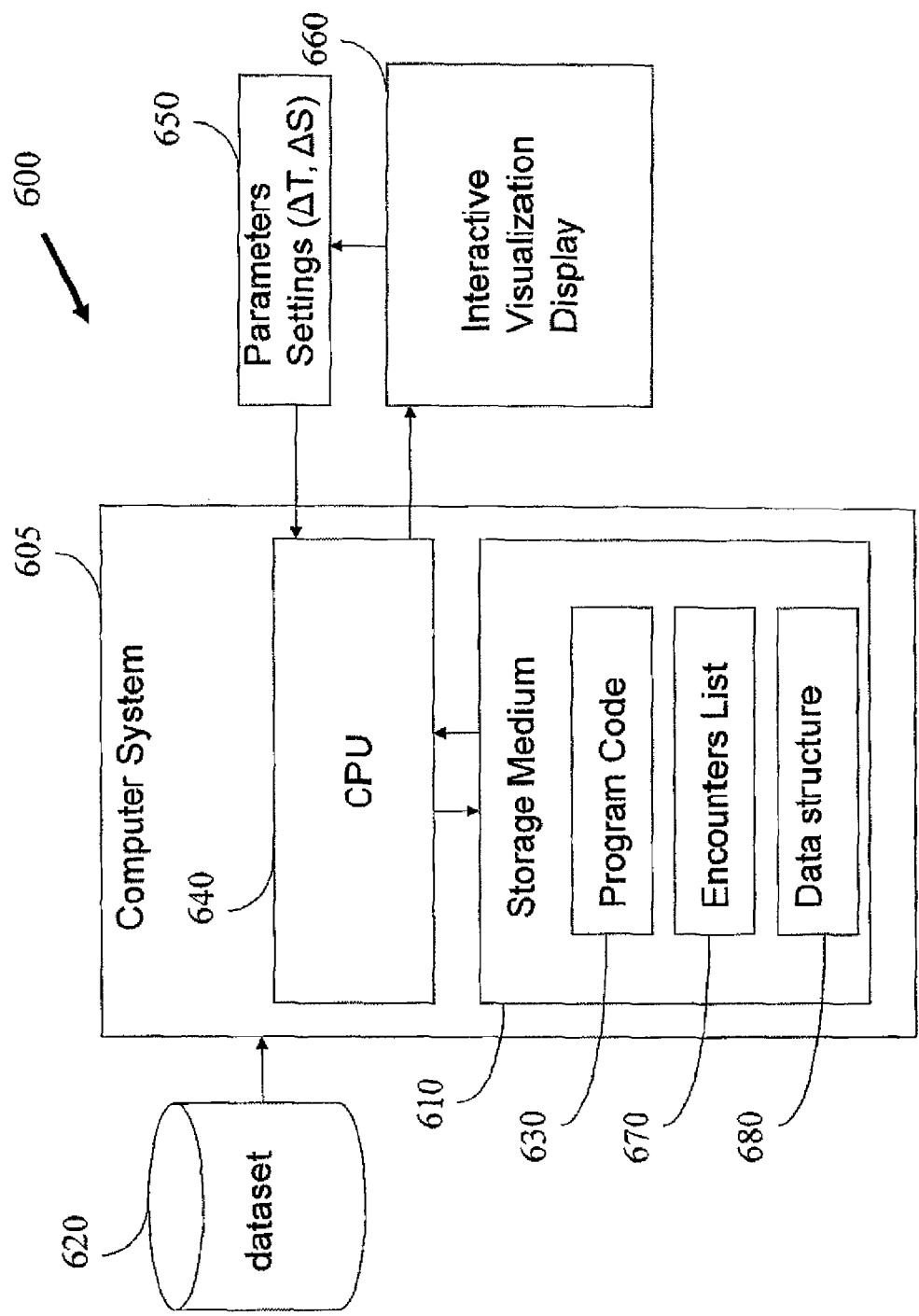
FIG. 6 is a schematic illustration of the spatiotemporal encounters detection system, according to embodiments of the present invention.

FIG. 6 is a schematic illustration of the spatiotemporal encounters detection system, according to embodiments of the present invention. The spatiotemporal encounters detection system 600 includes a computer system 605 further including a storage medium 610 for receiving and storing historical movement dataset 620 and spatiotemporal encounters detection program code 630, a central processing unit (CPU) 640 for executing program code, receiving user defined parameters 650 and a display 660 for interactively visualizing spatiotemporal encounters.

The spatiotemporal encounters detection system CPU may be programmed to create a data structure 670 and an encounters list 680 and to store the created data structure and encounters list in the storage medium for post processing.

Figure 7:
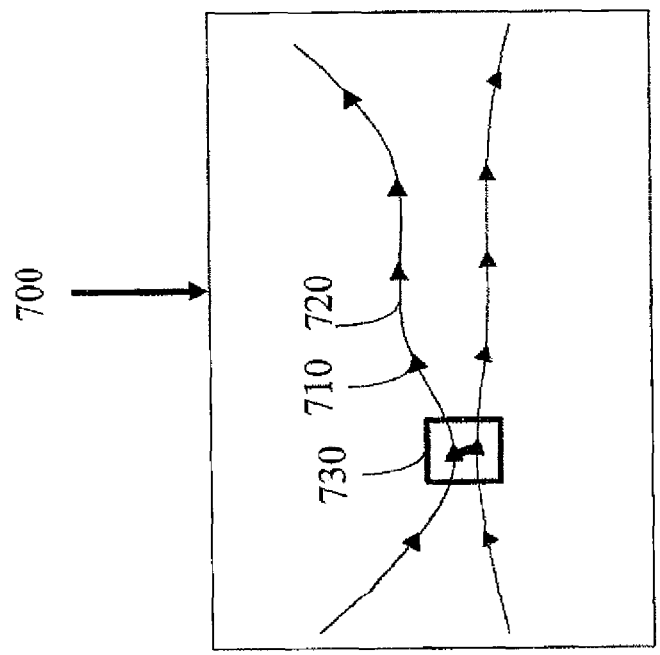
FIG. 7 is a schematic illustration of a spatiotemporal encounter pattern of two moving objects, according to embodiments of the present invention.

Reference is now made to FIG. 7, which is a schematic illustration of a spatiotemporal encounter pattern of two moving objects, according to embodiments of the present invention. Trajectories are visualized by marking data instances with an arrow 710 in the direction of movement of the object and connecting adjacent instances with a line 720. A spatiotemporal encounter 730 may be marked with a colored line. Color may be mapped to different semantic of temporal attributes of the encounter. Spatiotemporal encounters are defined by spatial proximity, which occurs between two or more objects, within a user define $\Delta S$ to be 10 meters for example with historical movement dataset of public transportation. Visualizing the encounters may reveal the encounter nature and may enable classifying encounter patterns in higher abstract level.

Figure 8:
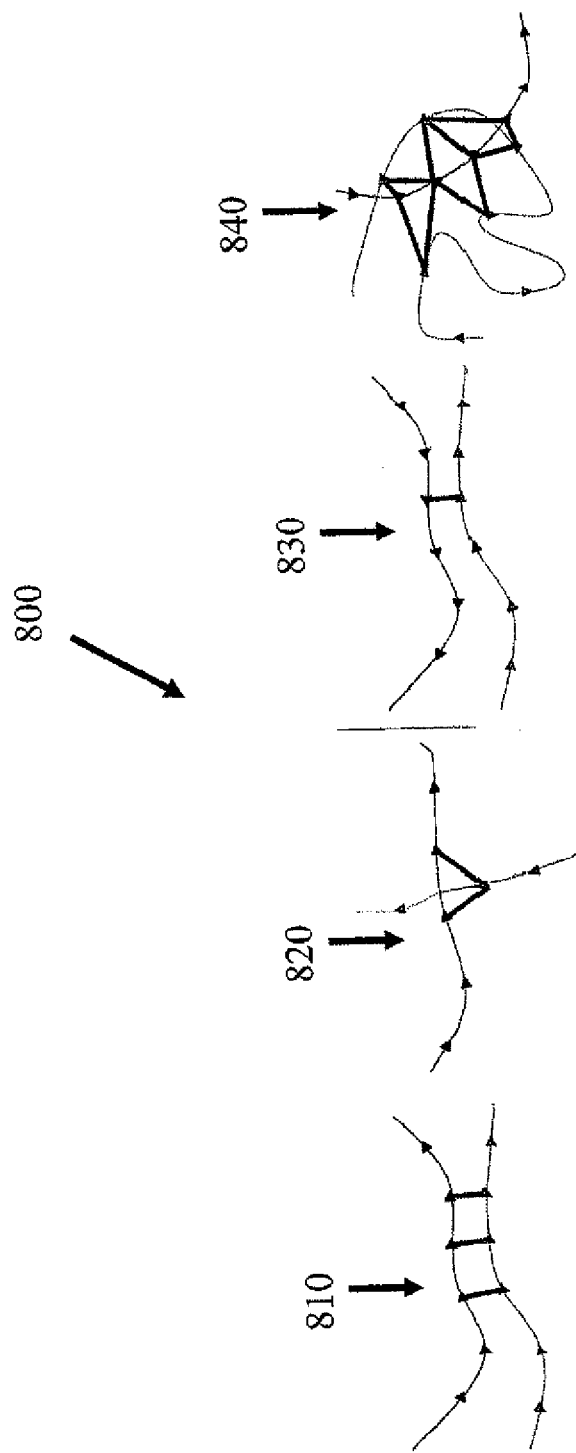
FIG. 8 is a schematic illustration of spatiotemporal encounter patterns of two moving objects, according to embodiments of the present invention.

FIG. 8 is a schematic illustration of spatiotemporal encounter patterns 800 of two moving objects, according to embodiments of the present invention. Parallel encounters pattern 810, cross encounter pattern 820, head on encounter pattern 830 and parking encounter pattern 840 are illustrated as an example of higher level encounter patterns emerging from multiple number of detected single encounters. As used herein, the term higher level encounter patterns means a sequence of single encounters that together form a pattern that may be classified to meaningful encounter patterns as shown in FIG. 8, 810-840.

Figure 9:
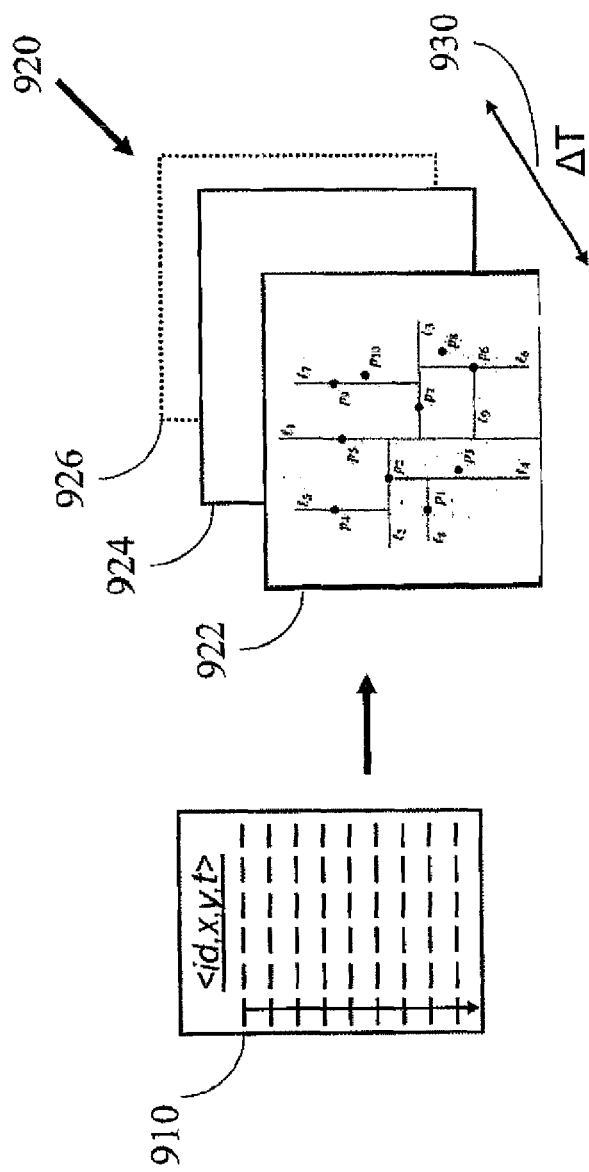
FIG. 9 is a schematic illustration of a historical movement dataset and a data structure, according to embodiments of the present invention.

FIG. 9 is a schematic illustration of a historical movement dataset and a data structure, according to embodiments of the present invention. A historical movement dataset 910 includes sampled trajectories of multiple objects where each data instance includes an identification number of the moving object, location information in the form of spatial coordinates (XY coordinates in two dimensional domains or XYZ in three dimensional domains) and a time stamp.

Data structure 920 includes a set of sorted lists, 922, 924, 926, where each list, data container, corresponds to a time stamp. According to a user defined $\Delta T$ 930, and a number of sorted lists, denoted herein as N, a temporal resolution may be calculated as follows $dt=\Delta T/N$.

The first list 922 corresponds to the time stamp [0,dt], the second list 924 corresponds to the next time stamp [dt, 2*dt], the third list 926 corresponds to the next time stamp [2*dt, 3*dt] and the N-th list corresponds to the time stamp [N−1*dt, N*dt]. The temporal resolution, dt, determines if the historical movement dataset is sparse and hence if interpolation of data instances are needed as described further below referring to FIGS. 13-14.

Figure 10:
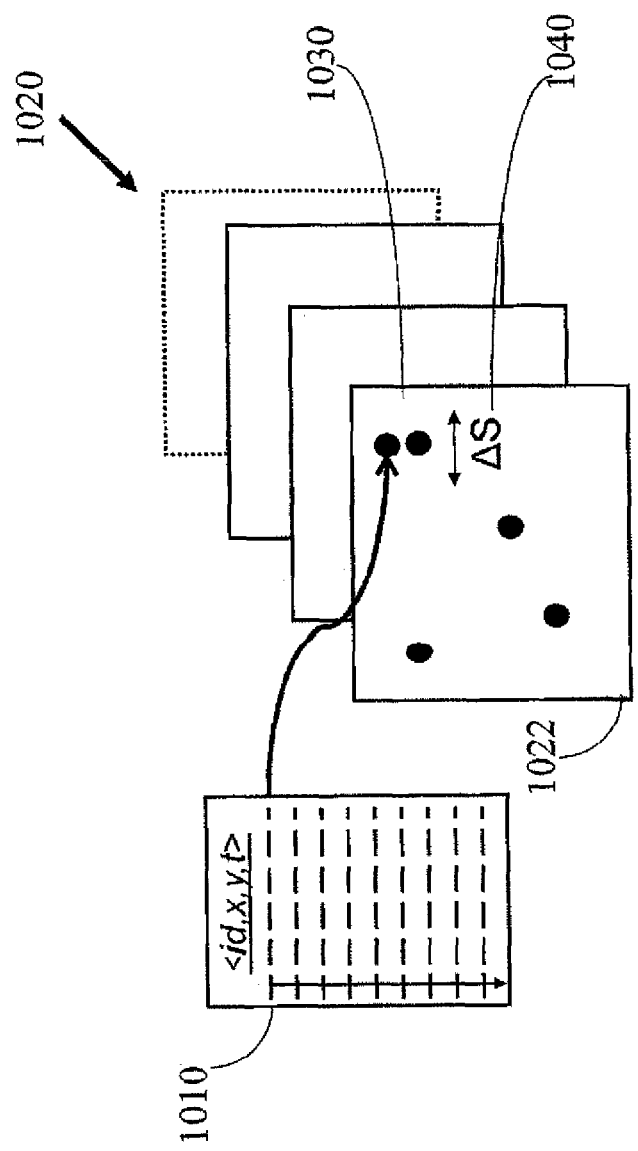
FIG. 10 is a schematic illustration of adding a data instance to the data structure, according to embodiments of the present invention.

Reference is now made to FIG. 10, which is a schematic illustration of adding a data instance to the data structure, according to embodiments of the present invention. A received data instance included in the input dataset 1010 is added to data structure 1020 by first looking for the list with the corresponding time stamp 1022, next the data instance is added to the list according to it spatial coordinates and hence the data structure orders the dataset in both time and spatial coordinates. If two data instances 1030 that belong to two different objects fall in the same list within a distance smaller than a user defined parameter spatial time window, $\Delta S$ 1040, a spatiotemporal encounter is detected and added to the encounters list.

Figure 11:
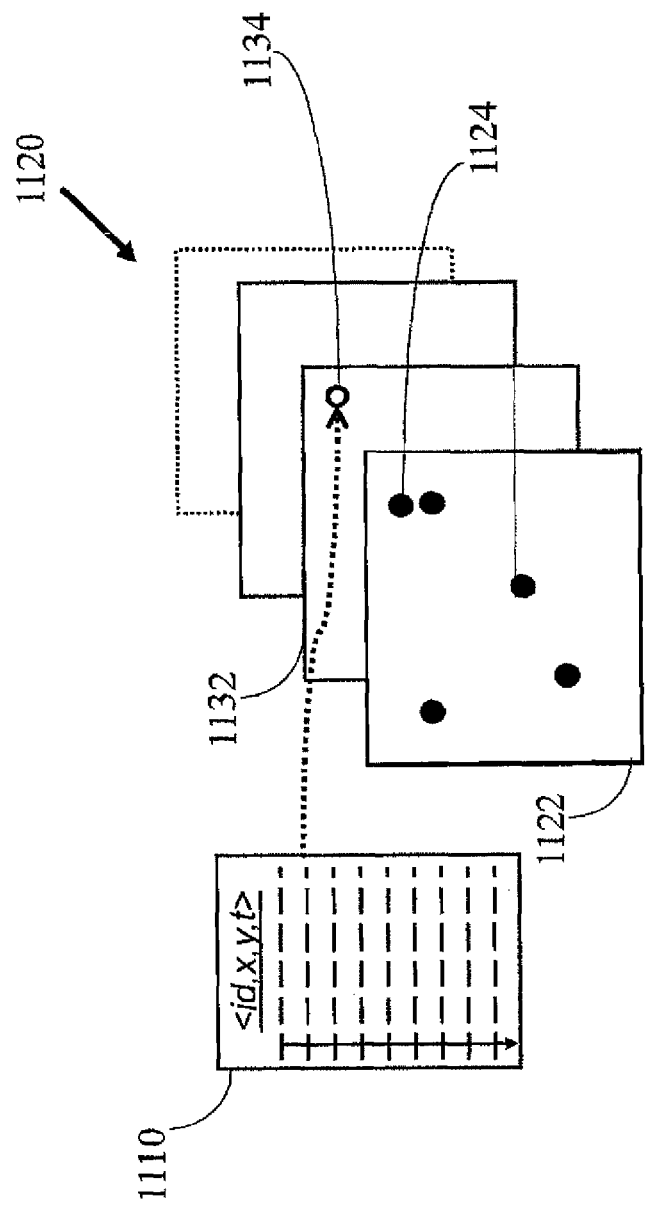
FIG. 11 is a schematic illustration of two data instances of the same object in two adjacent lists in the data structure, according to embodiments of the present invention.

FIG. 11 is a schematic illustration of two data instances of the same object in two adjacent lists in the data structure, according to embodiments of the present invention. Data instance 1124 that corresponds to the first list 1122 and data instance 1134 that corresponds to an adjacent list 1132 have the same identification number and hence belong to the same moving object. In this case the temporal resolution, dt, is sufficient and there is no need to fill in data structure 1120 with interpolated data instances that were not sampled and included in the historical movement dataset 1110. Two data instances that belong to the same object in adjacent lists within the spatial time window, $\Delta S$, define a self-encounter. Lack of self-encounters are used to determine a sparse dataset and to invoke an interpolation scheme described herein below.

Figure 12:
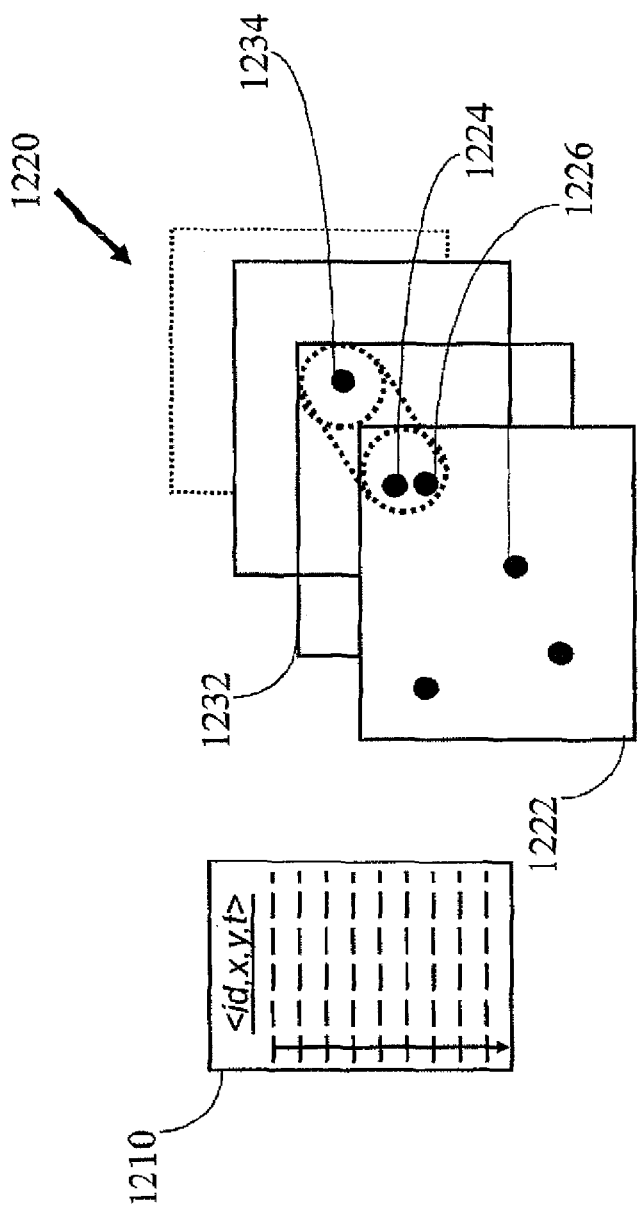
FIG. 12 is a schematic illustration of a spatiotemporal encounter and a self-encounter, according to embodiments of the present invention.

FIG. 12 is a schematic illustration of a spatiotemporal encounter and a self-encounter, according to embodiments of the present invention. Two data instances that belong to different objects 1224 and 1226 in a list are defined as detected spatiotemporal encounter if their spatial distance is less than $\Delta S$. Two data instances that belong to the same object 1224 and 1234 are in adjacent lists are defined as a self-encounter. If a data instance that belongs to object 1226 is not found in the adjacent list 1232, the dataset 1210 is too sparse and interpolation of new intermediate data instance 1220 is needed.

Figure 13:
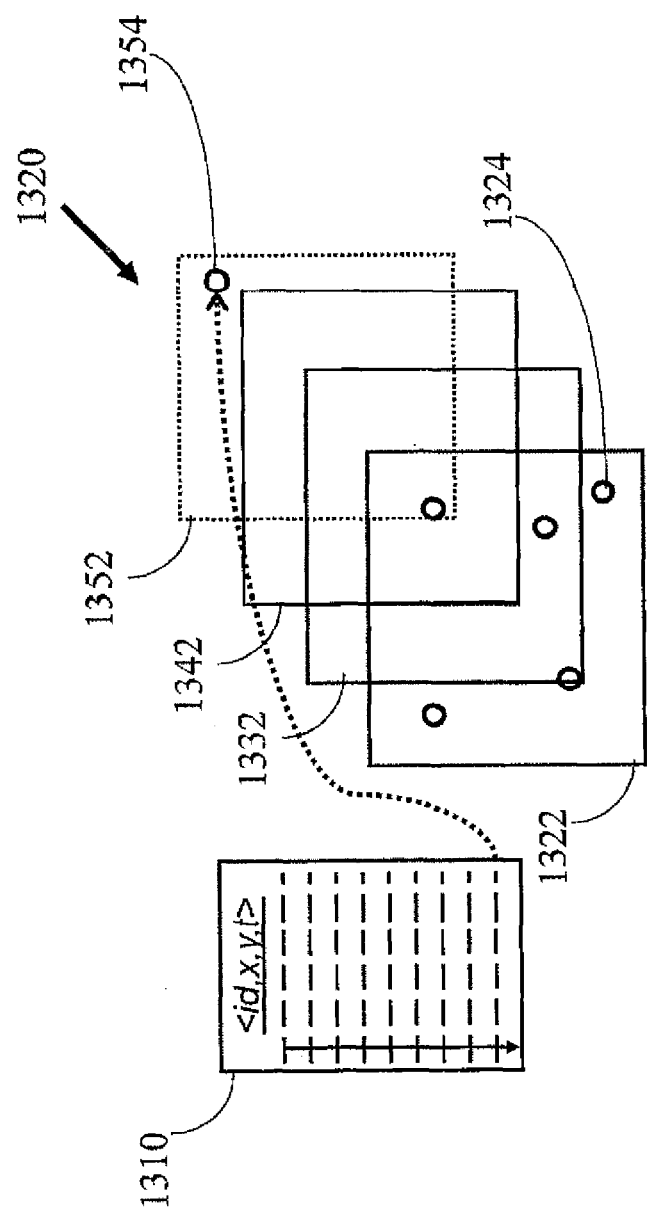
FIG. 13 is a schematic illustration of a sparse data structure, according to embodiments of the present invention.

FIG. 13 is a schematic illustration of a sparse data structure, according to embodiments of the present invention. Two data instances that belong to the same object 1324 and 1354 are found in two different lists 1322 and 1352 that are far apart in time and are separated by two intermediate lists 1332 and 1342 that do not include instances of the same object and may be vacant as shown in FIG. 13. According to embodiments of the present invention, a dataset 1310 with sparse data 1320 may be filled in with data instances using an interpolation scheme and spatiotemporal encounters may be detected referring to the interpolated data instances in data structure 1320.

Figure 14:
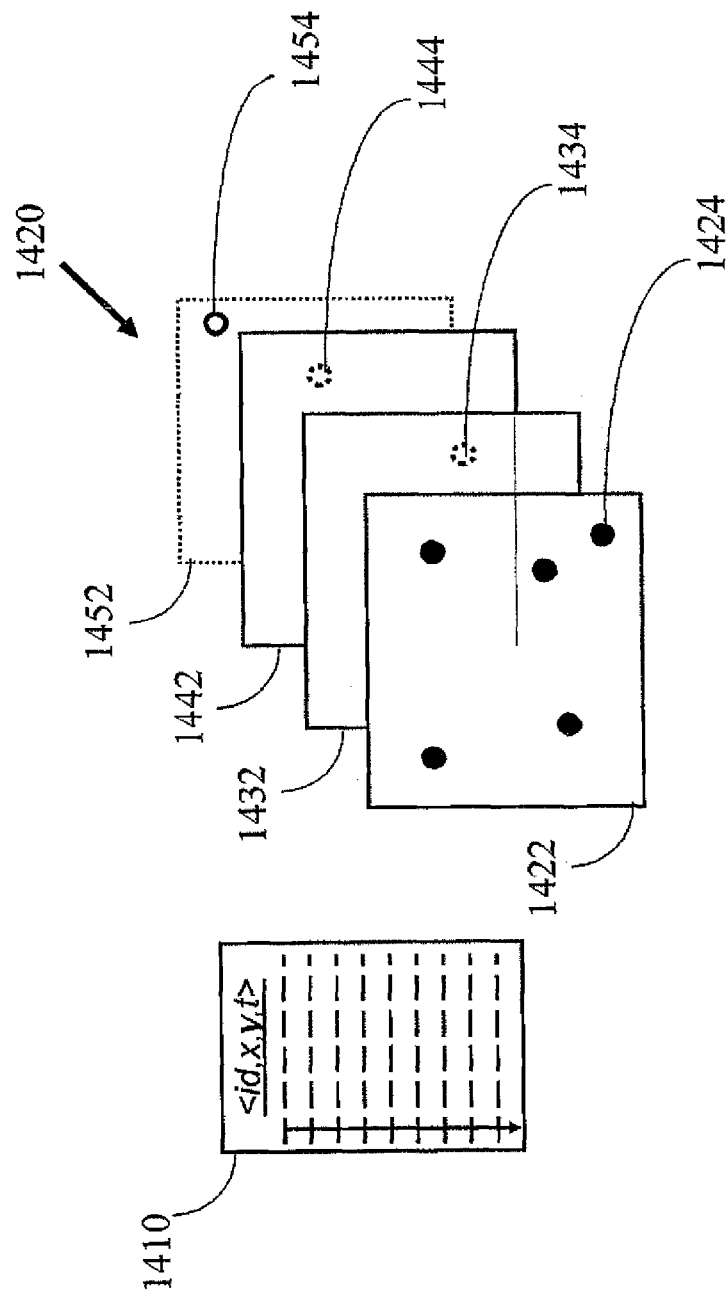
FIG. 14 is a schematic illustration of adding interpolated data instances to the data structure, according to embodiments of the present invention.
Figure 15:
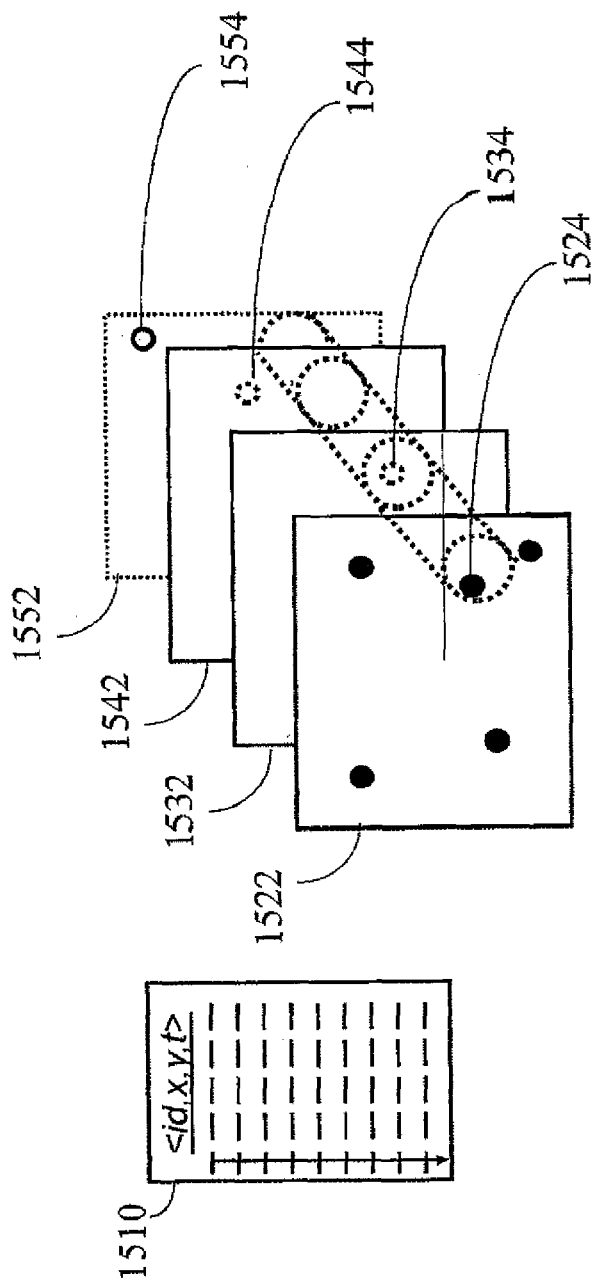
FIG. 15 is a schematic illustration of a spatiotemporal encounter of an object with an interpolated data instance, according to embodiments of the present invention.

FIG. 14 is a schematic illustration of adding interpolated data instances to the data structure, according to embodiments of the present invention. Data instances 1434 and 1444 are added to lists 1432 and 1442 and interpolated spatial coordinates calculated as averages of the spatial coordinates at the prior 1422 and next 1452 lists. FIG. 15 is a schematic illustration of a spatiotemporal encounter of an object with an interpolated data instance, according to embodiments of the present invention. Data instance 1524 in list 1522 and interpolated data instance 1534 in list 1532 are in spatial proximity of less than the spatial window size $\Delta S$ and belong to objects with different identification numbers. According to embodiments of the present invention, interpolation of data instance 1524 to adjacent lists, 1532, 1542 and 1552, intermediate spatial positions will occur and accordingly a spatiotemporal encounter between the two objects may be detected.

Figure 16A:
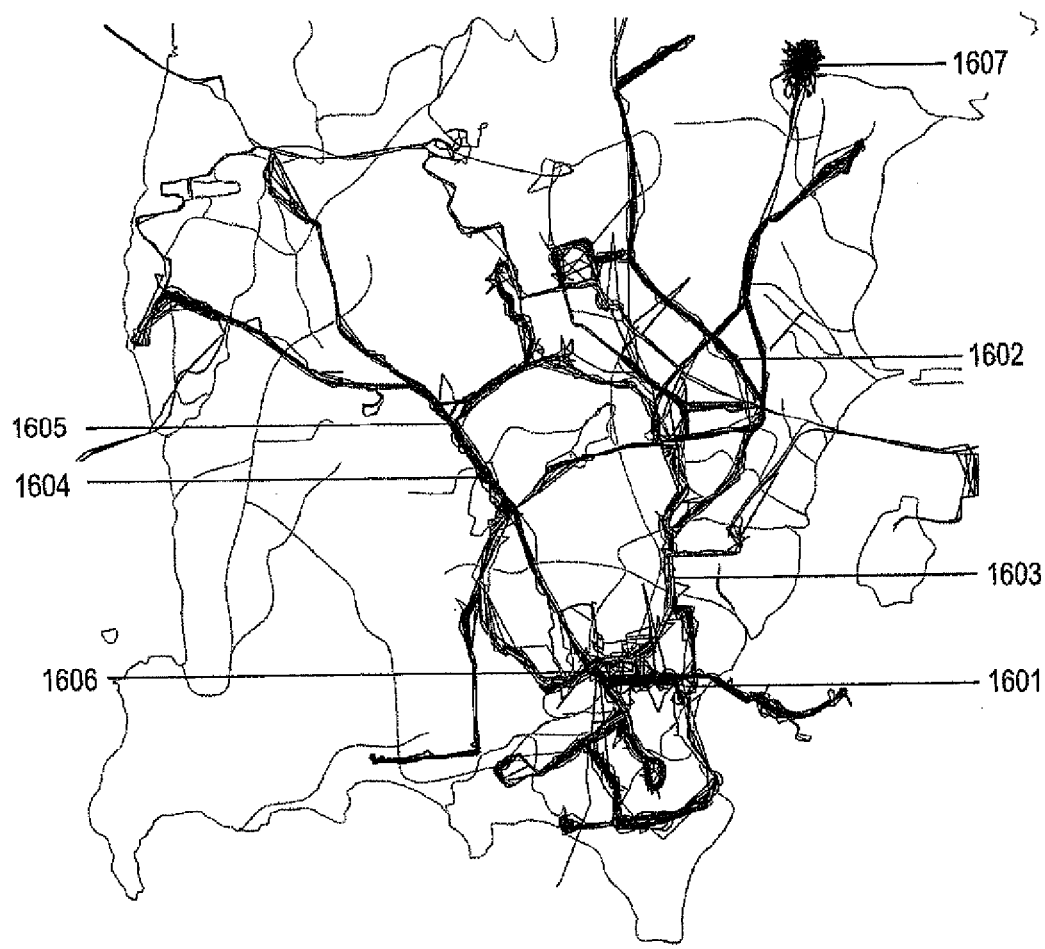
FIGS. 16a-c are visual images of real-world public transportation historical movement dataset, according to embodiments of the present invention.
Figure 16B:
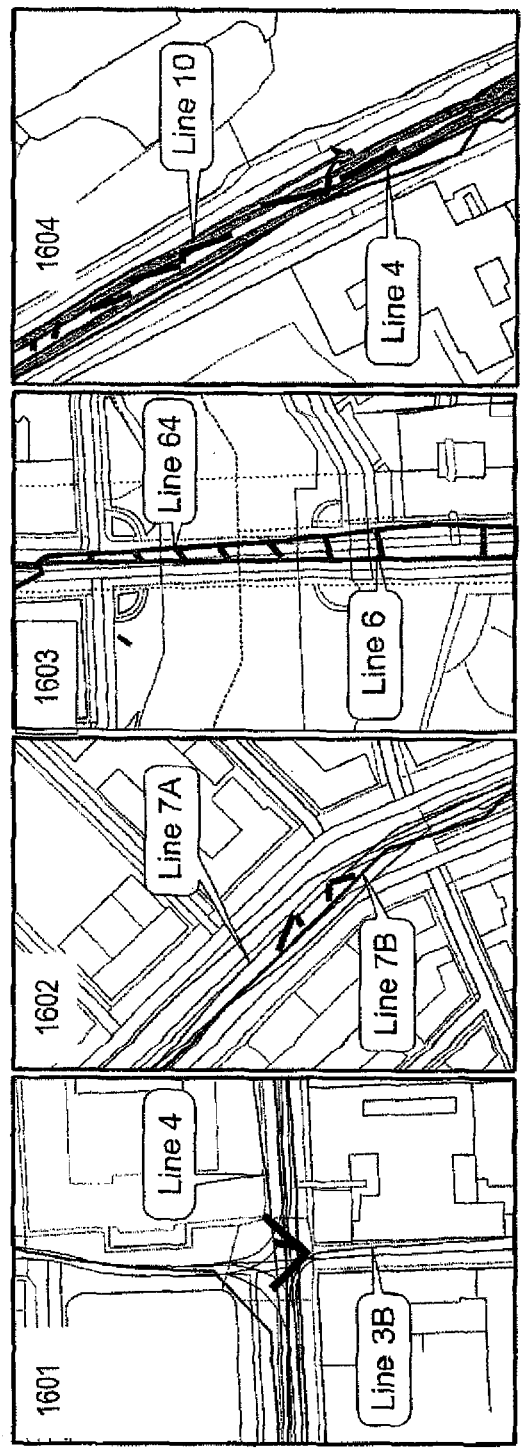
Figure 16C:
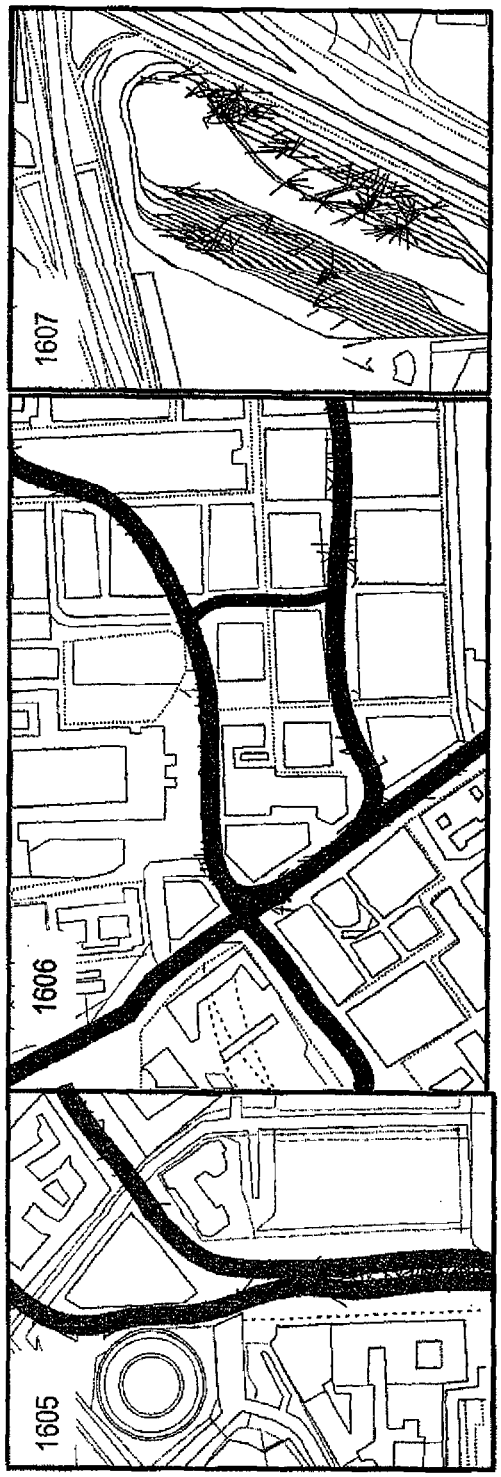

FIG. 16A-C are visual images of real-world public transportation historical movement dataset, according to embodiments of the present invention. FIGS. 16a-c visualize trajectories of exemplary application of public transportation routes, showing sampled traffic data during a single day in a single view FIG. 16a and in exploded views in FIG. 16b and FIG. 16c. The historical movement dataset provided more than 110 vehicles of 17 tram routes and 7 bus routes. The historical movement dataset contained more than 950 trajectories, with approximately 450,000 geographic positions in the domain.

The labeled locations in FIGS. 16a-c, 1601-1607, refer to encounter patterns classified and visualized by post processing the data in the encounters list where the encounters list was extracted from the public transportation historical movement dataset exemplary application by the spatiotemporal encounter method.

FIGS. 16a-c illustrate the resulting trajectories using a spatiotemporal visual and analytic web base tool that supports cartographic rendering and visualization of spatiotemporal data. Visual encoding of encounters is performed by connecting two distinct instances that participate in the spatiotemporal encounters and were listed in the encounters list.

Visualization of spatiotemporal encounters in historical movement data of public transportation allows higher level encounter patterns classification to the following encounters types for example: crossing a junction 1601, head on driving 1602, parallel driving 1603, following driving 1604, high density area 1605, high and low density areas 1606 and interleaving encounter pattern 1607 (typical for large public stations and parking areas).

According to embodiments of the present invention, a computer program product for spatiotemporal encounters detection in historical movement dataset of a plurality of moving objects is disclosed. The computer program product includes first program instructions to receive a dataset of a plurality of objects moving in a domain and second program instructions to concurrently order dataset in a data structure and to detect and store spatiotemporal encounters in an output encounters list, wherein the program instructions are stored on the computer readable storage medium.

The computer program product first program instructions used to concurrently order historical movement dataset in a data structure and to detect and store spatiotemporal encounters in an output encounters list may include instructions to order the input data instances in chronological lists that are further ordered according to spatial coordinates of the moving objects.

Optionally, the computer program product may further include third program instructions to classify the detected spatiotemporal encounters according to the moving objects characteristics that may be velocities, directions, duration of encounters, trajectory patterns and combinations thereof. The computer program product may further include fourth program instructions to visualize the spatiotemporal encounters.

Spatiotemporal encounters create a basis for defining higher level patterns beneficial for domain experts. Based on the disclosed method, system and computer product, authorities may be able to improve public services to citizens by reducing waiting times, performing real-world consistency tests for planned transitions and other tasks. The authorities may gain a comprehensive picture of how to make their service more economic and citizen friendly, in order to create a truly commercial and ecological alternative to private transportation.

The flowcharts in FIGS. 1, 2 and 3 and block diagrams in FIGS. 4, 5 and 6 illustrate the architecture, functionality, and operation of possible implementation of systems, methods, and computer program products according to various embodiments of the present invention.

In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

It is expected that during the life of a patent maturing from this application other relevant sorted lists that may be included in a data structure will be developed and the scope of the term set of sorted lists (SSL) is intended to include all such new technologies a priori.

As used herein the term "about" refers to ±10%.

The terms "comprises", "comprising", "includes", "including", "having" and their conjugates mean "including but not limited to". This term encompasses the terms "consisting of" and "consisting essentially of".

The phrase "consisting essentially of" means that the composition or method may include additional ingredients and/or steps, but only if the additional ingredients and/or steps do not materially alter the basic and novel characteristics of the claimed composition or method.

As used herein, the singular form "a", "an" and "the" include plural references unless the context clearly dictates otherwise. For example, the term "a compound" or "at least one compound" may include a plurality of compounds, including mixtures thereof.

The word "exemplary" is used herein to mean "serving as an example, instance or illustration". Any embodiment described as "exemplary" is not necessarily to be construed as preferred or advantageous over other embodiments and/or to exclude the incorporation of features from other embodiments.

The word "optionally" is used herein to mean "is provided in some embodiments and not provided in other embodiments". Any particular embodiment of the invention may include a plurality of "optional" features unless such features conflict.

Throughout this application, various embodiments of this invention may be presented in a range format. It should be understood that the description in range format is merely for convenience and brevity and should not be construed as an inflexible limitation on the scope of the invention. Accordingly, the description of a range should be considered to have specifically disclosed all the possible subranges as well as individual numerical values within that range. For example, description of a range such as from 1 to 6 should be considered to have specifically disclosed subranges such as from 1 to 3, from 1 to 4, from 1 to 5, from 2 to 4, from 2 to 6, from 3 to 6 etc., as well as individual numbers within that range, for example, 1, 2, 3, 4, 5, and 6. This applies regardless of the breadth of the range.

Whenever a numerical range is indicated herein, it is meant to include any cited numeral (fractional or integral) within the indicated range. The phrases "ranging/ranges between" a first indicate number and a second indicate number and "ranging/ranges from" a first indicate number "to" a second indicate number are used herein interchangeably and are meant to include the first and second indicated numbers and all the fractional and integral numerals therebetween.

It is appreciated that certain features of the invention, which are, for clarity, described in the context of separate embodiments, may also be provided in combination in a single embodiment. Conversely, various features of the invention, which are, for brevity, described in the context of a single embodiment, may also be provided separately or in any suitable subcombination or as suitable in any other described embodiment of the invention. Certain features described in the context of various embodiments are not to be considered essential features of those embodiments, unless the embodiment is inoperative without those elements.

Although the invention has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims.

All publications, patents and patent applications mentioned in this specification are herein incorporated in their entirety by reference into the specification, to the same extent as if each individual publication, patent or patent application was specifically and individually indicated to be incorporated herein by reference. In addition, citation or identification of any reference in this application shall not be construed as an admission that such reference is available as prior art to the present invention. To the extent that section headings are used, they should not be construed as necessarily limiting.

What is claimed is:

1. A method for spatiotemporal encounters detection of a plurality of moving objects, said method comprising:
   receiving a dataset comprising a plurality of data structures each one of said plurality of data structures mapping spatial coordinates and a time interval of each one of a plurality of objects moving in a domain;
   ordering said plurality of data structures according to respective said spatial coordinates of said plurality of objects;
   detecting a plurality of spatiotemporal encounters among said plurality of objects by correlating between respective said spatial coordinates and respective said time interval of at least two of said plurality of objects in different data structures of said plurality of data structures; and
   outputting a list of said detected spatiotemporal encounters,
   wherein said plurality of spatiotemporal encounters are detected in a single sweep over said plurality of data structures using a sliding window having a temporal window size ($\Delta T$) and a spatial window size ($\Delta S$) that determine a spatiotemporal encounter
   wherein said data structure comprises a spatial index structures selected from the group consisting of: sorted lists, K-D trees, range trees, and any combinations thereof;
   wherein said detecting are performed using pre-defined temporal and spatial thresholds for comparing the distance between the relevant instances' time stamps and spatial location to the said newly added instance.

2. The method of claim 1, wherein said structuring said dataset in a data structure and detecting said plurality of spatiotemporal encounters among said objects are performed concurrently.

3. The method of claim 2, wherein said structuring of data and detecting encounters comprises for each data instance received from said dataset:
   finding a first said list in said data structure whose time stamp contains the time stamp of the data instance;
   adding the data instance to said first list according to the object's spatial coordinates and testing for encounters with said data instance in each list in a pre-defined temporal sliding window which is said sliding window; and
   adding said encounters to said output encounters list.

4. The method of claim 1, wherein said received dataset includes, for each said moving object an identification number, spatial coordinates and a time stamp.

5. The method of claim 1, wherein each list in said data structure corresponds to a time stamp, and wherein said lists are ordered chronologically in said data structure.

6. The method of claim 1, further comprising modifying the pre-defined temporal and spatial thresholds and repeating said method with the modified window size.

7. The method of claim 1, further comprising adding a plurality of new interpolated data instances to said data structure to fill in a sparse or irregular temporal and spatial sampled datasets.

8. The method of claim 1, further comprising classifying the detected spatiotemporal encounters according to said moving objects characteristics selected from the group consisting of: velocities, directions, duration of encounters, trajectory patterns and combinations thereof.

9. The method of claim 8, further comprising visualizing interactively the classified spatiotemporal encounters.

10. The method of claim 8, further comprising recommending optimization actions in order to reduce the number of spatiotemporal encounters.

11. The method of claim 9, wherein said classified patterns are visualized on top of a background geographic map.

12. The method of claim 1, wherein said domain is selected from the group consisting of: transportation, traffic, retail and logistics and combinations of thereof.

13. The method of claim 1, wherein said dataset is selected from the group consisting of: historical movement dataset and real-time streaming dataset.

14. A spatiotemporal encounters detection system comprising:
   a storage medium for storing a dataset comprising a plurality of data structures each one of said plurality of data structures mapping spatial coordinates and a time interval of each one of a plurality of objects moving in a domain and spatiotemporal encounters detection program code comprising instructions for
   ordering said plurality of data structures in a data structure according to respective said spatial coordinates of said plurality of objects;
   detecting a plurality of spatiotemporal encounters among said plurality of objects by correlating between respective said spatial coordinates and respective said time interval of at least two of said plurality of objects in different data structures of said plurality of data structures; and
   a central processing unit (CPU) coupled to said storage medium for executing said program code, receiving user defined parameters and visualizing said detected spatiotemporal encounters on a display coupled to said CPU;
   wherein said plurality of spatiotemporal encounters are detected in a single sweep over said plurality of data structures using a sliding window having a temporal window size ($\Delta T$) and a spatial window size ($\Delta S$) that determine a spatiotemporal encounter;

wherein said data structure comprises a spatial index structures selected from the group consisting of: sorted lists, K-D trees, range trees, and any combinations thereof;

wherein said detecting are performed using pre-defined temporal and spatial thresholds for comparing the distance between the relevant instances' time stamps and spatial location to the said newly added instance.

15. The system of claim 14, wherein said CPU is programmed to create concurrently a data structure and an encounters list and to store said created data structure and encounters list in said storage medium for post processing.

16. A computer program product for spatiotemporal encounters detection in a dataset of moving objects, the computer program product comprising:
   a non transitory computer readable storage medium;
   first program instructions to receive a dataset comprising a plurality of data structures each one of said plurality of data structures mapping spatial coordinates and a time interval of each one of a plurality of objects moving in a domain; and
   second program instructions to concurrently order said plurality of data structures according to respective said spatial coordinates of said plurality of objects;
   third program instructions to detect a plurality of spatiotemporal encounters among said plurality of objects by correlating between respective said spatial coordinates and respective said time interval of at least two of said plurality of objects in different data structures of said plurality of data structures;
   fourth program instructions to classify the detected spatiotemporal encounters according to said moving object's characteristics selected from the group consisting of: velocities, directions, duration of encounters, trajectory patterns and combinations thereof;
   fifth program instructions to store said plurality of spatiotemporal encounters among said plurality of objects in an output encounters list,
   wherein said program instructions are stored on said non transitory computer readable storage medium;
   wherein said plurality of spatiotemporal encounters are detected in a single sweep over said plurality of data structures using a sliding window having a temporal window size ($\Delta T$) and a spatial window size ($\Delta S$) that determine a spatiotemporal encounter.

17. The computer program product of claim 16, further comprising fourth program instructions to visualize said classified spatiotemporal encounters.

18. The computer program product of claim 16, wherein said second program instructions used to concurrently order a dataset in said data structure and detect and store a plurality of spatiotemporal encounters among said plurality of objects in an output encounters list, comprising instructions to order chronologically said datasets in lists and to order said lists according to the object's spatial coordinates.

19. The computer program product of claim 16, wherein said dataset is selected from the group consistent of: a historical movement dataset and a real-time streaming dataset.

* * * * *